3,138,445
HERBICIDAL COMPOSITION AND METHOD
Hans Huemer, Konigstein, Taunus, Germany, assignor to Deutsche Gold- und Silber-Scheideanstalt vormals Roessler, Frankfurt am Main, Germany
No Drawing. Original application Aug. 17, 1960, Ser. No. 50,060, now Patent No. 3,079,391, dated Feb. 26, 1963. Divided and this application Jan. 29, 1962, Ser. No. 169,589
9 Claims. (Cl. 71—2.5)

The present invention relates to the production of novel triazine compounds.

One of the objects of the present invention is to produce a novel group of triazine compounds.

Another object of this invention is to provide the art with a novel and effective group of herbicides or plant growth regulating compounds.

This application is a division of copending application Serial No. 50,060, filed August 17, 1960, now Patent No. 3,079,391.

The novel compounds of the present invention have the general structures

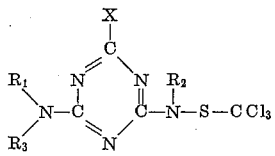

in which X is a halogen atom, $R_1$ and $R_2$ can be the same or different lower alkyl radicals having 1 to 5 C atoms and $R_3$ is a radical selected from the group consisting of hydrogen and lower alkyl radicals having 1 to 5 C atoms.

These compounds have unexpected utility as herbicides.

PRODUCING THE COMPOUNDS OF THE PRESENT INVENTION

The novel compounds of the present invention are produced by reacting a triazine compound having the structure

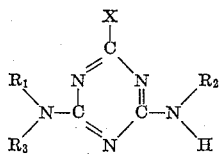

with perchloromethylmercaptan ($ClSCCl_3$).

$R_1$, $R_2$, $R_3$ and X have the same significance in this latter structure as they have in the former general structure.

Equivalent to excess quantities of perchloromethylmercaptan are used in order to form the $-SCCl_3$ radicals of the former structures.

In order to both facilitate and speed up the course of the reaction it is expedient to bind the resulting hydrochloric acid with basic compounds, particularly organic and preferably tertiary, cyclic bases, such as pyridine, collidine and quinoline. In this regard, 1 to 2 mols of these basic compounds are used, at most, for every mol of $-SCCl_3$ group to be added.

It is advantageous, as a rule, to conduct the reaction in the presence of a solvent, preferably organic, and expediently at a temperature between room temperature and the boiling point of the solvent.

The following examples are merely illustrative of the manner of producing the novel compounds of this invention and are not intended as a limitation thereon.

Example 1

In order to produce 2-trichloromethylmercaptoethylamino-4-ethylamino-6-chloro-1,3,5-triazine, 12.1 g. (0.1 mol) of collidine were uniformly added dropwise, at 50° C., over a period of 2 hours to a mixture of 20.2 g. (0.1 mol) of 2,4-bis-ethylamino-6-chloro-1,3,5-triazine in 300 cc. of benzene and 37.2 g. (0.2 mol) of perchloromethylmercaptan, which had been prepared at 50° C. in a 0.5 liter three necked flask equipped with a stirring device, reflux condenser, thermometer and dropping funnel. The entire reaction system was then stirred for 3½ hours more at 80° C.

The reaction mixture was then cooled to room temperature and the resulting precipitate, consisting of collidine hydrochloride and unreacted 2,4-bis-ethylamino-6-chloro-1,3,5-triazine, was filtered off. This recovered precipitate was washed out with water to remove the collidine hydrochloride and 6.4% of unreacted 2,4-bis-ethylamino-6-chloro-1,3,5-triazine, based on the amount of that compound originally charged into the reaction system, were recovered in pure form.

The benzene solution was vaporized to dryness, the residue was redissolved in benzene, washed chloride free with water, dried over sodium sulfate, vaporized again to dryness and the residue was digested several times at room temperature with petroleum ether and the final residue was 26.5 g. of light yellow 2-trichloromethylmercaptoethylamino-6-chloro-1,3,5-triazine with a melting point of 103.5–105° C. The yield amounted to 75.5 or 80% depending on whether it was based on the amount of 2,4-bis-ethylamino-6-chloro-1,3,5-triazine originally added to the reaction system or the amount of it that reacted.

In a similar fashion the following compounds were also obtained:

Light yellow 2-trichloromethylmercaptopropylamino-4-propylamino-6-chloro-s-triazine with a melting point of 83–85° C. in a yield of 76 or 84.5% from 2,4-bis-propylamino-6-chloro-s-triazine;

White 2-trichloromethylmercaptobutylamino - 4 - butylamino-6-chloro-s-triazine with a melting point of 90 to 92° C. in a yield of 82 or 86.5% from 2,4-bis-butylamino-6-chloro-s-triazine;

White 2-trichloromethylmercaptomethylamino - 4 - isopropylamino-6-chloro-s-triazine with a melting point of 82–83.5° C. in a yield of 71% based on the amount of 2-methylamino-4-isopropylamino-6-chloro-s-triazine originally added to the reaction system;

White 2-trichloromethylmercaptomethylamino-4-butylamino-6-chloro-s-triazine with a melting point of 127–128° C. in a yield of 69% based on the amount of 2-methylamino-4-butylamino-6-chloro-s-triazine originally added to the reaction system.

Example 2

In order to produce 2-trichloromethylmercaptomethylamino-4-diethylamino-6-chloro-1,3,5-triazine, a solution of 21.6 g. (0.1 mol) of 2-methylamino-4-diethylamino-6- chloro-1,3,5-triazine and 37.2 g. (0.2 mol) of perchloromethylmercaptan in 90 cc. of benzene were introduced into a 0.25 liter three necked flask equipped with a stirring device, reflux condenser, thermometer and dropping funnel. After the above solution was heated therein to 80° C. a second solution of 12.1 g. (0.1 mol) of collidine in 20 cc. of benzene was added to the former solution, dropwise, at 80° C. over a period of 3 hours. The entire reaction system was then stirred at 80° C. for an additional 3½ hours.

The reaction mixture was then cooled to room temperature and the resulting precipitate, consisting of collidine hydrochloride was filtered off with the aid of suction and washed with benzene. The benzene filtrate and wash solution were collected, vaporized to dryness in a vacuum and further dried at 80° C. The raw product thus obtained was purified by dissolving it in 200 cc. of pentane and filtering off small quantities of undissolved impurities. The pentane filtrate, in turn, was further purified by extracting it 5 times (100 cc. each time) with a 5% by weight aqueous solution of $NaHCO_3$ and 3 times (100 cc. each time) with a 5% by weight aqueous solution of hydrochloric acid and then washing the pentane solution with water until it was chloride free. After being dried over water free sodium sulfate the purified pentane solution was vaporized to dryness and the residue in turn was placed in a vacuum tank and further dried at 80° C. for 3 hours. In this way 33.4 g. of 2-trichloromethyl-mercaptomethylamino - 4 - diethylamino - 6 - chloro - 1,3,5-triazine were obtained which corresponds to a yield of 91.5%. The product was a clear, light yellow, viscous material.

USE OF THE NOVEL COMPOUNDS OF THE PRESENT INVENTION AS HERBICIDES

It has been unexpectedly found that the novel compounds of the present invention display unusual properties as plant growth regulators or herbicides. They can be used for the extermination or selective suppression of weeds among cultivated plants or they can be used for the complete destruction and prevention of undesirable vegetation. Under certain circumstances they can also be used to effect various stages of plant growth, for example, to remove leaves, to reduce the set of fruit, to retard the blossoming of flowers, and so forth. In addition to their effect on living plants these compounds can also be used to sterilize the soil. For these purposes they can either be used alone or in mixtures of several of them or in combination with other herbicidal materials. These compounds can be also used in admixture with insecticides, fungicides or fertilizers.

Some of these compounds described in this application are solid, crystalline materials while others are oils. For the most part these compounds are either insoluble or only slightly soluble in water. On the other hand they are generally very soluble in organic solvents which facilitates their use.

Organic solvents that can be used for these triazine compounds include, for example, ketones, hydrocarbons such as toluene, halogenated hydrocarbons such as chloronaphthalene, ethyl ether, petroleum oils such as diesel oil, vegetable oils or mixtures of these solvent materials.

The triazine compounds of this invention can be used in any of the various techniques which are known to all the technicians who work in this field, the choice of the particular technique to be used depending of course upon the circumstances in each case and the various properties of the individual herbicides. In general, common formulations can be used. For example, concentrated solutions of these triazine compounds in organic solvents can be prepared and then further diluted with the solvent just before use.

Concentrated solutions of these triazine compounds in organic solvents, which are miscible with water, can be diluted with water. In this case the triazine compounds will tend to precipitate out in a solid or liquid form. These suspensions or emulsions can be stabilized, if desired, with commonly used stabilizers.

Solutions of these compounds in organic solvents which are not miscible with water can be emulsified in water with the aid of commonly used emulsifying agents.

The triazine compounds of this invention can also be used on solid carriers. Such carriers would include, for example, clay, kaolin, diatomaceous earth, bentonite, talcum, finely ground calcium carbonate, wood flour, charcoal and the like.

The particular compound to be used can be mixed as is with the solid carrier. However, solutions or emulsions of these herbicides can also be sprayed on the solid carrier or mixed therewith and the sprayed products or mixtures subsequently dried.

In order to obtain an improved adherence of the herbicide to the carrier material, glue, casein, alginic acid salts and similar commonly known materials can be used as adhesives.

In addition, when necessary, these triazine compounds can be mixed together with the carrier materials as well as with the suspension agents and stabilizers in a, for example, paste or powder form and this mixture can then be stirred into water to form a suspension.

For wetting agents, emulsifiers and stabilizers, anionic, cationic or non-ionic materials known to the art can be used. These would include such materials, for example, as turkey red oil, salts of fatty acids, alkylenyl sulfonates, secondary alkyl sulfates, resinic acid salts, polyoxyethylene ethers of fatty alcohols, fatty acids or fatty amines, quaternary ammonium compounds, lignin sulfonic acids, saponin, gelatin and casein, used alone or in combination with one another.

The following examples are merely illustrative of the use of some of the novel triazine compounds of the present invention as herbicides or plant regulating agents and are not intended as a limitation upon the scope thereof.

Example 3

10 parts of 2-(N-trichloromethylmercapto-N-methylamino) - 4 - isopropylamino - 6 - chloro - 1,3,5 - triazine and 90 parts of diatomaceous earth were placed in a ball mill grinding device and milled until the average granule size of this mixture, to be used as a dusting powder, had attained a diameter of 50 microns.

Example 4

20 parts of 2-(N-trichloromethylmercapto-N-methylamino)-4-n-propylamino-6-chloro-1,3,5-triazine were dissolved in a mixture of 50 parts of cyclohexanol, 50 parts of xylene and 20 parts of a fatty acid polyglycol ether. When mixed with water this solution will give stable emulsions of any desired concentration.

Similar emulsions were prepared using 2-trichloromethylmercaptomethylamino - 4 - diethylamino - 6 - chloro-1,3,5-triazine.

The polyglycol ether was obtained by condensation of 1 mole stearic acid with 20 moles ethlyene oxide.

Example 5

A mixture of 40 parts of 2-(N-trichloromethylmercapto-N-methylamino)-4-tertiary butylamino-6-chloro-1,3,5-triazine, 2 parts of methyl naphthalene sulfonic acid, 2 parts of sulfite liquor, 20 parts of kaolin and 20 parts of talcum were finely ground in a ball mill. The resulting mixture can be stirred into water to form stable emulsions having a wide range of concentrations.

Example 6

10 parts of 2-(N-trichloromethylmercapto-N-ethyl-amino) - 4 - ethyl - amino - 6 - chloro - 1,3,5 - triazine were dissolved in 90 parts of diesel oil. This solution can be used as is for spraying purposes.

Example 7

The following compounds were comparatively tested to evaluate their plant growth regulating or herbicidal activity:

(1) 2 - (N - trichloromethylmercapto - N - methylamino)-4-methylamino-6-chloro-1,3,5-triazine

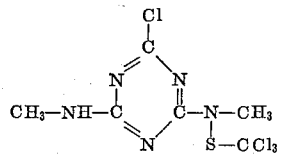

(2) 2 - (N - trichloromethylmercapto - N - methylamino)-4-ethyl-amino-6-chloro-1,3,5-triazine

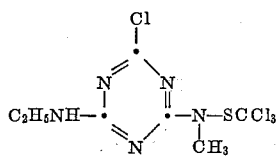

(3) 2 - (N - trichloromethylmercapto - N - methylamino)-4-isopropylamino-6-chloro-1,3,5-triazine

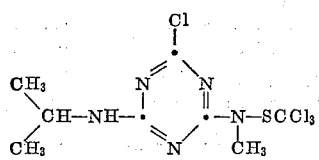

(4) 2 - (N - trichloromethylmercapto - N - methylamino)-4-n-propylamino-6-chloro-1,3,5-triazine

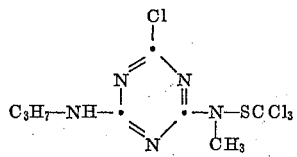

(5) 2 - (N - trichloromethylmercapto - N - methylamino)-4-tert.butylamino-6-chloro-1,3,5-triazine

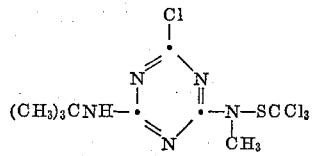

(6) 2 - (N - trichloromethylmercapto - N - methylamino)-4-isobutylamino-6-chloro-1,3,5-triazine

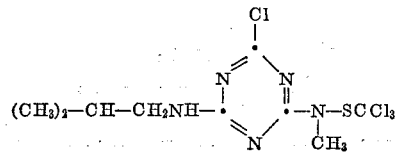

(7) 2 - (N - trichloromethylmercapto - N - methylamino)-4-n-butylamino-6-chloro-1,3,5-triazine

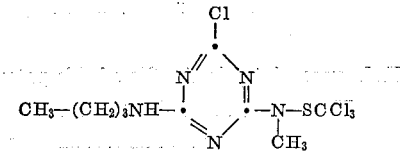

(8) 2 - (N - trichloromethylmercapto - N - ethylamino)-4-ethylamino-6-chloro-1,3,5-triazine

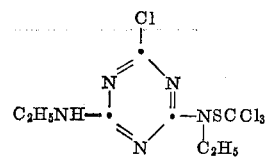

The effectiveness of these compounds was tested on oat, mustard and flax seeds and plants. They were used in the form of aqueous suspensions which were produced by stirring acetone solutions of these 8 compounds into water. These suspensions were obtained by dissolving 10 parts of the herbicide and 5 parts of Turkish red oil in 85 parts of acetone and pouring this solution in 9900 parts of water.

In one set of tests the suspensions were only used to treat the soil in which seeds had been planted. In a second series of tests, planted seeds were allowed to germinate into growing plants and the latter were treated with the suspensions by spraying them on the plants themselves. In a third series of tests, planted seeds were allowed to germinate into growing plants and the latter were treated with the suspensions by having the suspensions only applied to the soil in the vicinity of the particular plants being treated thereby.

The following tables list the results obtained by the various series of tests.

Table I shows the quantity of each of the eight tested compounds, calculated as kg./hectare (hectare=2.47 acres) which was needed in order to destroy 50% of the seeds or plants treated.

TABLE I

| Material Treated | Seeds | | Growing Plants | | | | | |
|---|---|---|---|---|---|---|---|---|
| Manner of Treatment | Soil Drenched | | Leaves Sprayed | | | Soil Drenched | | |
| Type Seed or Plant Treated | O | M | O | M | F | O | M | F |
| Compound Used: | | | | | | | | |
| 1 | X | X | 9.6 | <2.3 | X | X | 3.7 | 7.6 |
| 2 | X | <2.8 | 3.0 | <2.3 | <2.3 | 2.5 | <1 | <1 |
| 3 | X | <2.2 | <1 | <1 | <1 | <1 | <1 | <1 |
| 4 | X | <2.8 | 2.0 | <2.3 | <2.3 | 6.3 | <1 | <1 |
| 5 | X | <2.8 | <2.3 | <2.3 | <2.3 | 2.3 | <1 | <1 |
| 6 | X | 5.7 | 7.6 | <2.3 | 3.8 | 6.7 | 3.6 | <1 |
| 7 | X | X | X | 3.1 | 3.1 | 4.7 | 4.3 | 1.1 |
| 8 | X | 9.0 | X | 3.4 | 5.6 | X | X | 1.1 |

Table II shows the quantity of each of the eight tested compounds, calculated as kg./hectare (hectare=2.47 acres) which was needed in order to destroy 90% of the seeds or plants treated.

TABLE II

| Material treated | Seeds | | Growing plants | | | | | |
|---|---|---|---|---|---|---|---|---|
| Manner of treatment | Soil drenched | | Leaves sprayed | | | Soil drenched | | |
| Type seed or plant treated | O | M | O | M | F | O | M | F |
| Compound used: | | | | | | | | |
| 1 | X | X | X | 6.8 | X | X | 8.1 | X |
| 2 | X | X | 9.6 | <2.3 | 8.2 | X | X | 7.0 |
| 3 | X | X | X | <1 | X | 9.0 | 9.4 | 8.1 |
| 4 | X | 7.2 | X | <2.3 | 7.6 | X | X | 6.6 |
| 5 | X | 9.3 | 8.4 | <2.3 | <2.3 | X | 7.8 | 6.6 |
| 6 | X | X | X | <2.3 | 9.8 | X | 8.5 | X |
| 7 | X | X | X | 10.0 | 11.0 | X | 10.0 | 7.7 |
| 8 | X | X | X | X | 11.2 | X | X | 3.4 |

In the above tables: O=oat; M=mustard; F=flax.

I claim:

1. A plant growth regulating composition comprising phytotoxic quantities of, as an active ingredient, at least one triazine compound having the structure

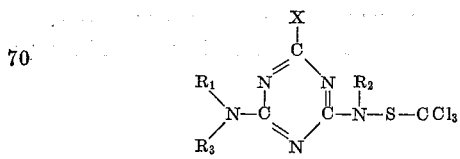

in which X is halogen, $R_1$ and $R_2$ are lower alkyl having 1 to 5 carbon atoms and R₃ is a radical selected from the group consisting of hydrogen and lower alkyl having 1 to 5 carbon atoms and an emulsifier which is inert with respect to said active ingredient.

2. A plant growth regulating composition comprising phytotoxic quantities of, as an active ingredient, at least one triazine compound having the structure

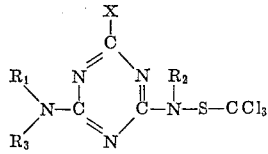

in which X is halogen, R₁ and R₂ are lower alkyl having 1 to 5 carbon atoms and R₃ is a radical selected from the group consisting of hydrogen and lower alkyl having 1 to 5 carbon atoms and a wetting agent which is inert with respect to said active ingredient.

3. A plant growth regulating composition comprising an aqueous suspension of phytotoxic quantities of, as an active ingredient, at least one triazine compound having the structure

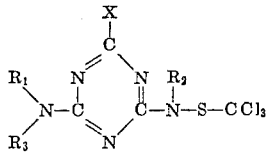

in which X is halogen, R₁ and R₂ are lower alkyl having 1 to 5 carbon atoms and R₃ is a radical selected from the group consisting of hydrogen and lower alkyl having 1 to 5 carbon atoms and a stabilizing agent for said suspension of said active ingredient.

4. A plant growth regulating composition comprising phytotoxic quantities of, as an active ingredient, at least one triazine compound having the structure

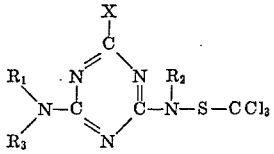

in which X is halogen, R₁ and R₂ are lower alkyl having 1 to 5 carbon atoms and R₃ is a radical selected from the group consisting of hydrogen and lower alkyl having 1 to 5 carbon atoms and an organic solvent inert with respect to said active ingredient and an emulsifier inert with respect to said active ingredient.

5. A method of inhibiting plant growth which comprises bringing into contact with at least a part of the plant phytotoxic quantities of at least one triazine compound having the structure

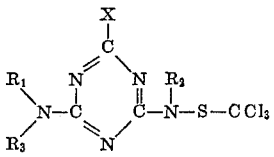

in which X is halogen, R₁ and R₂ are lower alkyl having 1 to 5 carbon atoms and R₃ is a radical selected from the group consisting of hydrogen and lower alkyl having 1 to 5 carbon atoms and a carrier inert with respect to said triazine compound.

6. A method of inhibiting plant growth which comprises bringing into contact with the environment of the plant phytotoxic quantities of at least one triazine compound having the structure

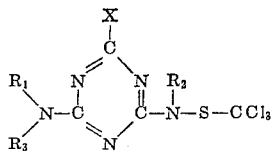

in which X is halogen, R₁ and R₂ are lower alkyl having 1 to 5 carbon atoms and R₃ is a radical selected from the group consisting of hydrogen and lower alkyl having 1 to 5 carbon atoms and a carrier inert with respect to said triazine compound.

7. A method of inhibiting plant growth which comprises bringing into contact with the leaves of the plant phytotoxic quantities of at least one triazine compound the structure

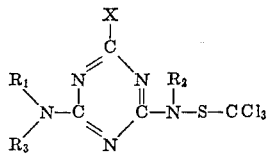

in which X is halogen, R₁ and R₂ are lower alkyl having 1 to 5 carbon atoms and R₃ is a radical selected from the group consisting of hydrogen and lower alkyl having 1 to 5 carbon atoms and a carrier inert with respect to said triazine compound.

8. A method of inhibiting plant growth which comprises bringing into contact with the soil in which the plant is growing phytotoxic quantities of at least one triazine compound having the structure

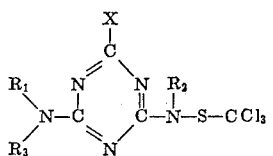

in which X is halogen, R₁ and R₂ are lower alkyl having 1 to 5 carbon atoms and R₃ is a radical selected from the group consisting of hydrogen and lower alkyl having 1 to 5 carbon atoms and a carrier inert with respect to said triazine compound.

9. A method of inhibiting plant growth which comprises bringing into contact with the seeds of such plant phytotoxic quantities of at least one triazine compound having the structure

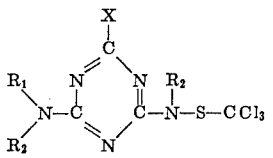

in which X is halogen, R₁ and R₂ are lower alkyl having 1 to 5 carbon atoms and R₃ is a radical selected from the group consisting of hydrogen and lower alkyl having 1 to 5 carbon atoms and a carrier inert with respect to said triazine compound.

References Cited in the file of this patent

UNITED STATES PATENTS

| | | |
|---|---|---|
| 2,951,079 | Schroeder et al. | Aug. 30, 1960 |
| 3,014,907 | Kober | Dec. 26, 1961 |

FOREIGN PATENTS

| | | |
|---|---|---|
| 1,135,848 | France | Dec. 22, 1956 |